T. C. BROWNE AND C. F. BRUSH, Jr.
THERMOPHONE AND METHOD OF MAKING IT.
APPLICATION FILED APR. 26, 1920.

1,407,726. Patented Feb. 28, 1922.

INVENTORS
Theodore C. Browne
Charles F. Brush, Jr.
By
ATTORNEYS

UNITED STATES PATENT OFFICE.

THEODORE C. BROWNE, OF BELMONT, MASSACHUSETTS, AND CHARLES F. BRUSH, JR., OF CLEVELAND, OHIO, ASSIGNORS TO AMERICAN THERMOPHONE COMPANY, OF BOSTON, MASSACHUSETTS, A CORPORATION OF MASSACHUSETTS.

THERMOPHONE AND METHOD OF MAKING IT.

1,407,726.        Specification of Letters Patent.    Patented Feb. 28, 1922.

Application filed April 26, 1920. Serial No. 376,514.

*To all whom it may concern:*

Be it known that we, THEODORE C. BROWNE, of Belmont, in the county of Middlesex and State of Massachusetts, and CHARLES F. BRUSH, Jr., of Cleveland, in the county of Cuyahoga and State of Ohio, both citizens of the United States, have invented a new and useful Improvement in Thermophones and Methods of Making Them, of which the following is a specification.

In all thermophone receivers which have heretofore been made, extremely fine metallic wires or sheets of foil, such as gold leaf have been used. When telephone currents are made to pass through these attenuated conductors, the conductors are heated to a greater or less temperature, the temperature varying with the strength of the current passing through the conductors. The temperature of the air surrounding the hot conductors varies with the temperature of the conductors and as a consequence its density changes in a similar manner. By enclosing the hot conductors in a small air chamber having a small orifice, changes in the air are produced which follow with remarkable fidelity the fluctuations in the telephone current and produce sounds which are commensurate in volume, if the air passage of the air chamber is directed into the listener's ear, with the sounds derived from an electromagnetic receiver of the type long used in telephony.

Up to the present time it has been found impossible to make thermophone receivers using foil on account of mechanical difficulties and it has become the universal practice to use a number of small platinum wires, the number of wires and their arrangement depending upon the resistance which is required for the circuit in which the receiver is to be used. It has been found necessary, in order to make the variations in the temperature of the wires follow closely the variations in the electrical current, to use extremely fine wire, of a diameter approximating 2 microns. It is impossible to handle platinum wires of such small diameter and to assemble them in a receiver. As a consequence, Wollaston wires are used during the manufacture and after the wires are assembled the outer coating of the wires is removed by acid thus leaving the extremely fine platinum wires. The etching must be carried out without interfering with the arrangement of the many wires relative to each other within the receiver. For if the wires are bent, not only is there a liability of the wires breaking, but there is danger of the wires coming into contact with each other and by such short circuit destroying the efficiency of the device. To avoid this tendency to deflect the wires, arising from the surface tension of the acid during the etching process, the spacing between the wires has to be made fairly large with a consequent increase in the volume of the containing air chambers. This is objectionable as the larger the air chamber, other things being the same, the less efficient is the device as a receiver.

Again platinum wires expand considerably when heated. This fact makes it necessary to so mount the conductors that there is the least liability of fracture with changing temperature. In the best thermophones heretofore designed this difficulty has been reduced by bending the wires into loops and supporting the loops by the ends only. Difficulty has always been found in using intermediate supports to hold the loops in position.

We have been able to overcome all of the above mechanical difficulties by the use of carbon instead of metal for the conductors. Carbon filaments mounted in the manner to be described are stronger, more serviceable, and possess certain characteristics which make it possible to manufacture receivers as efficient as those using metal wires and at a less cost. Moreover by our design and by the use of carbon filaments we are able to obtain many more conductors within a given volume of air container. This arises partly from the fact that with carbon no acid or other liquid is used in the manufacturing process which would tend to pull and hold the filaments close together, and partly from the fact that the carbon filaments contract during the process of manufacture so that surfaces of the filaments, which when first assembled are in close proximity to each other, recede to a sufficient extent to remove the danger of short circuits between adjacent filaments. Again, on account of its porous structure, carbon offers a large surface in comparison with its cross section, which greatly facilitates the transfer of heat from the filament to the surrounding air. Also, on account of the tendency of carbon to absorb and give off gases when its temperature is changed, the production of sound by the transfer of heat from the filament to the surrounding air is supplemented and it is therefore possible to obtain good results when the filaments are of considerably greater diameter than the metal filaments now in use.

In the drawings our invention is shown in its preferred form.

A is a base of heat-resisting insulating material in which are mounted, in the form of our invention shown, four posts B, B¹, B², and B³ made preferably of graphite or carbon though they may be of other conducting material. To the lower ends of these posts are attached the leads b, b. A number of filaments C are electrically connected to these posts in parallel. D is a cap which sets down onto a shoulder a on the base A and is provided with an opening d to allow the escape of the sound waves produced in the chamber D¹ within the cap D.

Figure 1:
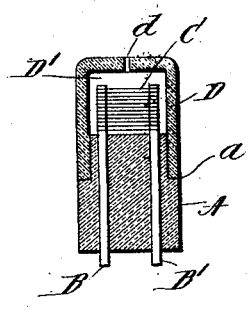
Figure 1 is a vertical section through a telephone receiver embodying our invention.
Figure 2:
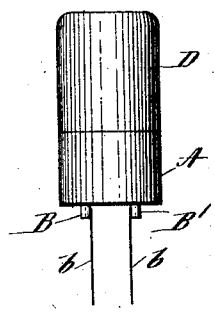
Fig. 2 being an elevation thereof.
Figure 3:
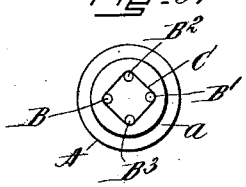
Fig. 3 is a top view, the cover being removed.
Figure 4:
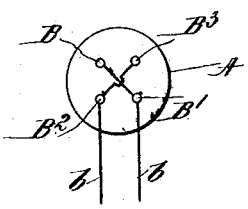
Figs. 4 and 5 are bottom views showing two ways of attaching the leads to the posts.
Figure 5:
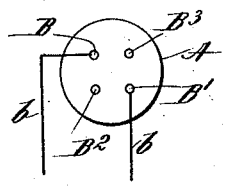

We have shown two ways of connecting the leads b, b with the device. In Fig. 4 the posts B, B¹ are connected, one of the leads b running from the post B¹, B³ being also connected with B², which is connected with the other lead b. In Fig. 5 the connections are in series parallel, one lead b running to the post B and the other lead to the post B¹.

In constructing our device the base plate A having been provided with the posts B, B¹, B² and B³, the filaments C are placed about, and fastened to, the posts in any convenient manner, and the device as a whole is then heated in a non-oxidizing atmosphere until the filaments C are carbonized.

The fibre used to form the carbon filaments may be any fibre of small diameter which is capable of being carbonized. The small fibres of cotton or the pappus of other plants or fibres such as flax or pina may be used if of sufficiently small diameter. We have found, however, that fibres of artificial silk or viscose are well adapted for this purpose since they contain less ash and are more easily handled on account of their greater length than natural vegetable fibres.

We have found it convenient to carbonize these fibres in a silica combustion tube in an electric tube furnace, although those skilled in the art will see that this may be done in other ways. A non-oxidizing atmosphere, necessary to prevent the burning of the filaments, may be secured by passing hydrogen or nitrogen through the tube or chamber in which the filaments are heated, and this atmosphere should be maintained from the time the heating is begun until the furnace has cooled almost to room temperature. Any gas which does not contain oxygen or other injurious constituent may be used. We do not mean, however, to limit ourselves to this method of carbonizing or to this construction.

What we claim as our invention is:

1. A thermophone receiver comprising an insulating base, non-metallic posts mounted on said base, a heat-producing member mounted on, and electrically connecting, said posts, and a perforated cap located to enclose said heat-producing member, said heat-producing member comprising a plurality of non-metallic conducting filaments, said posts being adapted to serve as terminals for connection with an electric circuit.

2. A thermophone receiver comprising an insulating base, posts mounted on said base, a heat-producing member mounted on, and electrically connected to, said posts, and a perforated cap enclosing said posts and said heat-producing member, said heat-producing member comprising a plurality of non-metallic conducting filaments, each connected to two of said posts, and said posts being adapted to serve as terminals for connection with an electric circuit.

3. That method of constructing a thermophone which comprises mounting a plurality of non-metallic conductive posts on an insulating base, electrically and permanently connecting said posts with a plurality of non-metallic fibres and heating said fibres in a non-oxidizing atmosphere until said fibres are carbonized and form non-metallic conductors supported on said insulating base.

THEODORE C. BROWNE.
CHARLES F. BRUSH, Jr.